United States Patent [19]

Bar

[11] 4,325,680
[45] Apr. 20, 1982

[54] VALVE SYSTEM FOR ENCAPSULATED MOTOR-COMPRESSOR UNITS

[75] Inventor: Alfredo Bar, Pavia, Italy

[73] Assignee: NECCHI Societa per Azioni, Pavia, Italy

[21] Appl. No.: 214,767

[22] Filed: Dec. 9, 1980

[30] Foreign Application Priority Data

Jan. 23, 1980 [IT] Italy ................ 42902 A/80

[51] Int. Cl.³ ............................................ F16K 15/14
[52] U.S. Cl. ................ 417/569; 137/512.15;
137/516.11; 137/851
[58] Field of Search ............... 137/512, 512.1, 512.15,
137/516.11, 843, 851, 855–858; 417/560, 566, 569, 571

[56] References Cited

U.S. PATENT DOCUMENTS

| | | | |
|---|---|---|---|
| 1,222,321 | 4/1917 | Peters | 137/512.1 |
| 2,970,608 | 2/1961 | Doeg | 137/516.11 |
| 3,039,487 | 6/1962 | Doeg | 137/516.11 |
| 3,370,786 | 2/1968 | Brown | 137/512.15 X |
| 3,751,005 | 8/1973 | Earley | 251/368 |

FOREIGN PATENT DOCUMENTS

1956259  5/1971  Fed. Rep. of Germany ............ 137/516.11

*Primary Examiner*—Robert G. Nilson
*Attorney, Agent, or Firm*—Stevens, Davis, Miller & Mosher

[57] ABSTRACT

The invention relates to a valve system for encapsulated motor-compressor units comprising a cylinder, a piston moving with reciprocating motion in the cylinder, a valve plate which upperly closes the cylinder, and a head fixed on to the valve plate, wherein in the valve plate there are provided two delivery ports having cross-sections of different size, so as to create in the lamina valve an asymmetric elastic deformation which favors gradual impact of the valve against the valve plate at the end of the compression cycle.

1 Claim, 4 Drawing Figures

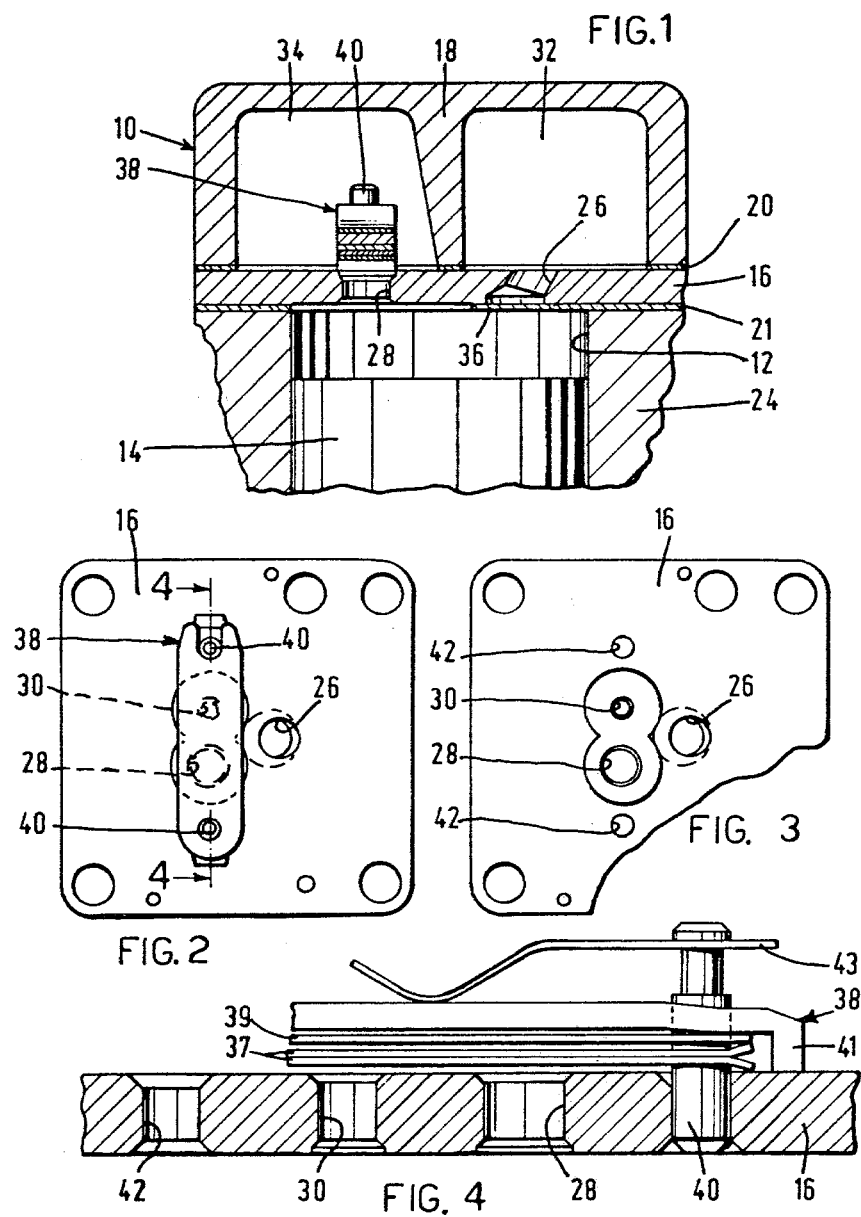

VALVE SYSTEM FOR ENCAPSULATED MOTOR-COMPRESSOR UNITS

This invention relates to improvements in a valve system for encapsulated motor-compressor units for refrigerators. High volumetric efficiency, low operating noise and long life of the dynamically stressed members are the main characteristics of such valve systems, and much study has been carried out with the object of obtaining increasingly improved results in this field. The noise containing problem is particularly felt in the case of the delivery valve, which is subjected to greater dynamic stress. The object of the present invention is to provide a valve system configured in such a manner as to further reduce the noise originating from the impact of the delivery valve lamina against the plate during repeated closure and opening. The technical problem to be solved in order to attain the aforesaid object consists of obtaining an elastic deformation of the lamina for each operating cycle, such as to prevent repeated impact against the valve plate.

Said technical problem is solved by providing in said valve plate two delivery ports having cross-sections of different size, so as to create in the lamina valve an asymmetric elastic deformation which favors gradual impact of said valve against said valve plate at the end of the compression cycle.

Further characteristics and advantages will be apparent from the description given hereinafter of a preferred embodiment of the invention with reference to the accompanying drawings in which:

FIG. 1 is a partial view of the motor-compressor unit on which the new valve system is fitted;

FIGS. 2 and 3 show the valve plate, and

FIG. 4 is a section through the valve plate on the line 4—4 of FIG. 2.

FIG. 1 shows a partial view of the motor-compressor unit 10, of which the reference numeral 12 indicates the cylinder in which the piston 14 moves with reciprocating motion. The cylinder 12 is closed upperly by the valve plate 16, and the head 18 rests on said plate. Suitable seal gaskets 20 and 21 are disposed between the head and valve plate and between the valve plate and cylinder body 24 respectively. The valve plate 16 comprises the suction port 26 and delivery ports 28 and 30 which connect the cylinder 12 to the suction chamber 32 and delivery chamber 34 respectively. The suction valve 36 is disposed at the port 26, whereas the delivery valve 38 covers the delivery ports 28 and 30. The delivery valve, indicated overall by 38 in FIG. 1, comprises two superposed thin resilient laminas 37 mounted at their ends on two pins 40 inserted into the bores 42 in the valve plate 16. Said laminas 37 are disposed above the two ports 28 and 30 and are free to make vertical movements limited by the stop plate 39 which is also mounted on the pins 40. The purpose of the crosspiece 41 and the retention spring 43 is to retain the constituent elements and hold them together in accordance with a known technique (FIG. 4). The operation of said lamina valves is determined by the pressure changes in the cylinder which arise during each compressor operating cycle. In accordance with the idea of the invention, two ports 28 and 30 are provided in the valve plate 16. Said ports, of circular cross-section, have different diameters so as to preserve the advantage of greater volumetric efficiency than valves having a single port, and to provide the added advantage, over the existing state of the art which comprises two ports of equal cross-section, of creating an asymmetric elastic deformation in the laminas 37. In this manner, when the pressure ceases, the resilient return of said laminas does not give rise to repeated impact against the plate, with consequent high noise. In fact, the impact of the lamina against the plate is gradual, and begins in the region of minimum deformability, to gradually propagate towards the regions of maximum deformability.

I claim:

1. A valve sytem for encapsulated motor-compressor units comprising a cylinder, a piston moving with reciprocating motion in said cylinder, a valve plate which upperly closes said cylinder, a head fixed on to said valve plate, said valve plate defining therein two delivery ports having cross-sections of different size, and a delivery valve positioned over said delivery ports, said delivery valve comprising two pins attached to said valve plate, two laminae, a stop plate for said laminae, a crosspiece and retention spring, said laminae, stopplate, crosspiece, and retention spring being retained by said pins, said two delivery ports creating an asymmetric elastic deformation which favors gradual impact of said valve against said valve plate at the end of the compression cycle.

* * * * *